US007204759B2

(12) United States Patent
Yamagishi

(10) Patent No.: US 7,204,759 B2
(45) Date of Patent: Apr. 17, 2007

(54) METHOD AND APPARATUS FOR OPTIMUM ARRANGEMENT OF SELECTION OBJECTS

(76) Inventor: Junichi Yamagishi, c/o Unirec Co., Ltd., 6-3, 2-Chome, Kaminarimon, Taito-ku (JP) 111-0034

( * ) Notice: Subject to any disclaimer, the term of this patent is extended or adjusted under 35 U.S.C. 154(b) by 401 days.

(21) Appl. No.: 10/096,745

(22) Filed: Mar. 13, 2002

(65) Prior Publication Data

US 2003/0176207 A1 Sep. 18, 2003

(51) Int. Cl.
*A63F 9/00* (2006.01)
*G09B 25/00* (2006.01)

(52) U.S. Cl. .......................................... 463/48; 434/80

(58) Field of Classification Search .................... 463/4, 463/40–42, 16, 48; 434/72–80
See application file for complete search history.

(56) References Cited

U.S. PATENT DOCUMENTS 4,283,709 A * 8/1981 Lucero et al. ................ 463/25
4,652,239 A * 3/1987 Brimberg ..................... 434/80
4,947,322 A * 8/1990 Tenma et al. ................. 434/72
6,007,425 A * 12/1999 Takemoto et al. ............ 463/16
6,257,981 B1 * 7/2001 Acres et al. .................. 463/26
6,383,077 B1 * 5/2002 Kweitko et al. .............. 463/40
6,638,170 B1 * 10/2003 Crumby ....................... 463/42
6,690,156 B1 * 2/2004 Weiner et al. ......... 324/207.17
6,857,959 B1 * 2/2005 Nguyen ....................... 463/25

FOREIGN PATENT DOCUMENTS

JP 11039364 A * 2/1999

OTHER PUBLICATIONS

The Simplification Of Data Warehouse Design by Frank Teklitz © 2000—http://www.sybase.pt/gvsview/gvs/sybasept/eventos/iq_2003/docs/iq_whitepaper.pdf.*

High Stake ssoftware by Chris Forsyth Winter 2001 http://www.compudigm.com/pdfs/seePOWER_Gaming_SybaseMagazine_Winter2001.pdf.*

* cited by examiner

*Primary Examiner*—Mark Sager
*Assistant Examiner*—Robert Mosser
(74) *Attorney, Agent, or Firm*—Jordan and Hamburg LLP

(57) ABSTRACT

An arrangement of selection objects includes an area model memory (1) for storing a configuration model of an area, an object model memory (3) for storing configuration models of respective selection objects, an image frame outputter (5) for performing an image frame indication of the configuration models, a model operator (7) for performing an arranging operation of the configuration models of the respective selection objects on the configuration model of the area in an image frame, a controller (9) for arranging the configuration models of the respective selection objects on the configuration model of the area in accordance with the arranging operation, a frequency information inputting device (11) for inputting to the controller (9) selection frequency information of the respective selection objects actually arranged in the area in accordance with an arrangement by the arranging operation, and an identification indicator (13) for performing an identifying indication of the configuration models by the image frame indication in accordance with the input selection frequency information.

21 Claims, 7 Drawing Sheets

FIG.8

| No | DESCRIPTION | MACHINE KINDS | TOTAL SALES | WORKING DAYS | SALES PER DAY |
|---|---|---|---|---|---|
| 1 | CRANE | A | ΣM1 | 28 | m1 |
| 2 | ROTARY | B | ΣM2 | 28 | m2 |
| 3 | ... | C | ... | ... | ... |
| ... | ... | D | ... | ... | ... |
| ... | ... | E | ... | ... | ... |
| ... | ... | F | ... | ... | ... |
| ... | ... | G | ... | ... | ... |
| ... | ... | H | ... | ... | ... |
| ... | ... | I | ... | ... | ... |
| ... | ... | J | ... | ... | ... |
| ... | ... | K | ... | ... | ... |

METHOD AND APPARATUS FOR OPTIMUM ARRANGEMENT OF SELECTION OBJECTS

BACKGROUND OF THE INVENTION

1. Field of the Invention

The present invention relates to a method and an apparatus for optimum arrangement of selection objects, such as for optimum arrangement of a plurality of kind of playing machines in an amusement arcade.

2. Description of the Related Art

Conventionally, in an amusement arcade or such, there have been arranged a plurality of kinds of playing machines within a limited area. The plurality of kinds of playing machines include a playing machine that is frequently used by players, and a playing machine that is not. It therefore is essential for a manager of such an amusement arcade to make rearrangement of a playing machine, which is small of frequency of use (frequency of selection) , for raising the frequency of use, or to make replacement of the playing machine small of frequency of use with another playing machine.

However, it is difficult to make rearrangement or the like of a respective playing machine in an amusement arcade, directly grasping the frequency of use. In other words, a set of playing machines in the amusement arcade is not completely separable into two subsets, one subset of those high of frequency of use and the other subset of those low of frequency of use, but has a variety of playing machines mixed therein, including those of medium frequencies of use, with one of a medium but somewhat high frequency of use inclusive, so that it is quite troublesome as work to make rearrangement or the like of the set of playing machines under a decision to be made accurate and direct in the amusement arcade with respect to the frequency of use of a respective playing machine.

It also is difficult in rearrangement to decide how to move which playing machine for the rearrangement to be accurate and smooth.

Further, it also is difficult in the amusement arcade to accurately and directly grasp such relationships that playing machines have relative to locations of power service outlets, entrances and exits, emergency exits, and interiors.

SUMMARY OF THE INVENTION

It is an object of the present invention to provide a method and an apparatus for optimum arrangement of selection objects, allowing for an optimum arrangement of selection objects such as playing machines to be performed with an increased accuracy in a facilitated manner.

To achieve the object, according to a first aspect of the present invention, there is provided a method for optimum arrangement of selection objects, comprising the steps of: providing a configuration model of an area for a plurality of kinds of selection objects to be arbitrarily arranged therein, and configuration models of respective selection objects; performing an arrangement of the configuration models of the respective selection objects on the configuration model of the area, collecting selection frequency information of the respective selection objects actually arranged in the area in correspondence to the arrangement of the configuration models thereof; performing an identifying indication of the configuration models in accordance with the selection frequency information; and performing a rearrangement of the configuration models of the selection objects on the configuration model of the area in accordance with the identifying indication, actually rearranging the selection objects in the area in correspondence to the rearrangement.

According to a second aspect of the invention, there is provided an apparatus for optimum arrangement of selection objects, comprising: area model memory means for storing a configuration model of an area for a plurality of kinds of selection objects to be arbitrarily arranged therein; object model memory means for storing configuration models of respective selection objects; image frame outputting means for performing an image frame indication of the configuration models of the selection objects and the area; model operating means for performing an arranging operation of the configuration models of the respective selection objects on the configuration model of the area in an image frame; a controller for arranging the configuration models of the respective selection objects on the configuration model of the area in accordance with the arranging operation; frequency information inputting means for inputting to the controller selection frequency information of the respective selection objects actually arranged in the area in accordance with an arrangement by the arranging operation; and identifying indication means for performing an identifying indication of the configuration models by the image frame indication in accordance with the input selection frequency information, wherein the controller rearranges the configuration models of the selection objects on the configuration model of the area by the arranging operation of the model operating means in accordance with the identifying indication.

According to a third aspect of the invention, there is provided a variation of an apparatus for optimum arrangement of selection objects according to the second aspect, wherein the image frame outputting means performs the image frame indication of the configuration models of the selection objects and the area by at least one of a plan view and a bird's-eye view.

According to a fourth aspect of the invention, there is provided a variation of an apparatus for optimum arrangement of selection objects according to the second or third aspect, further comprising, besides the image frame indication: a board of magnetic material indicating the configuration model of the area; and a plurality of magnet members respectively indicating the configuration models of the plurality of kinds of selection objects.

According to a fifth aspect of the invention, there is provided a variation of an apparatus for optimum arrangement of selection objects according to any of the second to fourth aspects, wherein the area comprises an amusement arcade for playing machines to be arranged therein, the plurality of kinds of selection objects comprise a plurality of kinds of playing machines, and the selection frequency information comprises money collection information of respective playing machines.

According to a sixth aspect of the invention, there is provided a variation of an apparatus for optimum arrangement of selection objects according to the fifth aspect, wherein the configuration model of the area has area environment information.

According to a seventh aspect of the invention, there is provided a variation of an apparatus for optimum arrangement of selection objects according to the sixth aspect, wherein the area environment information comprises at least one of location information of a power service outlet, location information of an entrance and an exit, location information of an emergency exit, and interior information.

According to the first aspect of the invention, an arrangement of configuration models of respective selection objects is performed on a configuration model of an area, selection frequency information is collected of the respective selection objects actually arranged in the area in correspondence to the arrangement of the configuration models thereof, and an identifying indication of the configuration models is performed in accordance with the selection frequency information. The identifying indication allows for a whole grasping such as of which area or which selection object is high or low in selection frequency.

Under such a condition, a rearrangement of the configuration models of the selection objects is performed on the configuration model of the area in accordance with the identifying indication, allowing for the selection objects to be actually rearranged in the area in correspondence to the rearrangement.

Accordingly, it is possible to rearrange the selection objects, while wholly grasping which selection object is high or low in selection frequency, allowing for the rearrangement of selection objects to be performed accurately and very easily. It also is possible to grasp relationships such as between a selection object to be removed by the rearrangement and the configuration of a designated point of the area as a destination of the removal, as well as to promptly decide whether or not the selection object can be properly removed, allowing for an accurate and smooth rearrangement.

Further, it also is possible to decide by which route the selection object to be removed should be removed for a removal to be performed without giving a significant influence on any selection object else, allowing for the rearrangement to be performed accurately and very easily from such a point of view, as well.

According to the second aspect of the invention, it is possible to store in an area model memory means a configuration model of an area for a plurality of kinds of selection objects to be arbitrarily arranged therein, store configuration models of respective selection objects in an object model memory means, and perform an image frame indication of the configuration models of the selection objects and the area by an image frame outputting means.

Then, it is possible to perform by a model operating means an arranging operation of the configuration models of the respective selection objects on the configuration model of the area in an image frame, and to arrange by a controller the configuration models of the respective selection objects on the configuration model of the area in accordance with the arranging operation. It is possible by a frequency information inputting means to input to the controller selection frequency information of the respective selection objects actually arranged in the area in accordance with an arrangement by the arranging operation, and by an identifying indication means to perform an identifying indication of the configuration models by the image frame indication in accordance with the input selection frequency information. It is possible for the controller to rearrange the configuration models of the selection objects on the configuration model of the area by the arranging operation of the model operating means in accordance with the identifying indication.

It therefore is possible, by the arranging operation of the model operating means in accordance with the identifying indication, to perform an operation, while wholly grasping the selection frequencies of the selection objects, allowing for the rearrangement of selection objects to be performed accurately and very easily. It also is possible, from a relationship between a selection object to be removed and the configuration of a designated point of the area as a destination of the removal, to promptly decide whether or not the selection object can be removed, allowing for an accurate and smooth rearrangement. Further, it is possible to promptly decide by which route the selection object to be removed should be removed for a removal to be performed without giving a significant influence on any selection object else, allowing for the rearrangement to be performed accurately and very easily from such a point of view, as well.

According to the third aspect of the invention, in addition to the effects of the second aspect, it is possible by the image frame outputting means to perform the image frame indication of the configuration models of the selection objects and the area by at least one of a plan view and a bird's-eye view. It therefore is possible, in the case of a plan view, to decide relationships between the area and the selection objects in a plan configuration, and in the case of a bird's-eye view, to decide relationships between the area and the selection objects in a height direction, as well, allowing for an accurate and smooth rearrangement.

According to the fourth aspect of the invention, in addition to the effects of the second or third aspect, it is possible, by rearranging a plurality of magnet members respectively indicating the configuration models of the plurality of kinds of selection objects on a board of magnetic material indicating the configuration model of the area while checking the identifying indication of the configuration models performed on the image frame by the identifying indication means, to rearrange the configuration model of the area and the configuration models of the selection objects, directly touching them, allowing for a easy rearrangement.

According to the fifth aspect of the invention, in addition to the effects of any of the second to fourth aspects, it is possible, by money collection information of respective playing machines, to easily check the selection frequencies of the selection objects, allowing for a plurality of kinds of playing machines to be rearranged accurately and very easily in an amusement arcade.

According to the sixth aspect of the invention, in addition to the effects of the fifth aspect, it is possible to perform a rearrangement with an increased accuracy in a facilitated manner, in consideration of area environment information, as the configuration model of the area has the area environment information According to the seventh aspect of the invention, in addition to the effects of the sixth aspect, it is possible, as the area environment information comprises at least one of location information of a power service outlet, location information of an entrance and an exit, location information of an emergency exit, and interior information, to perform a rearrangement with an increased accuracy in a facilitated manner, checking the above-noted information.

BRIEF DESCRIPTION OF THE ACCOMPANYING DRAWINGS

FIG. 8 is a chart of money collection information according to the embodiment.

DETAILED DESCRIPTION OF THE PREFERRED EMBODIMENTS

Figure 1:
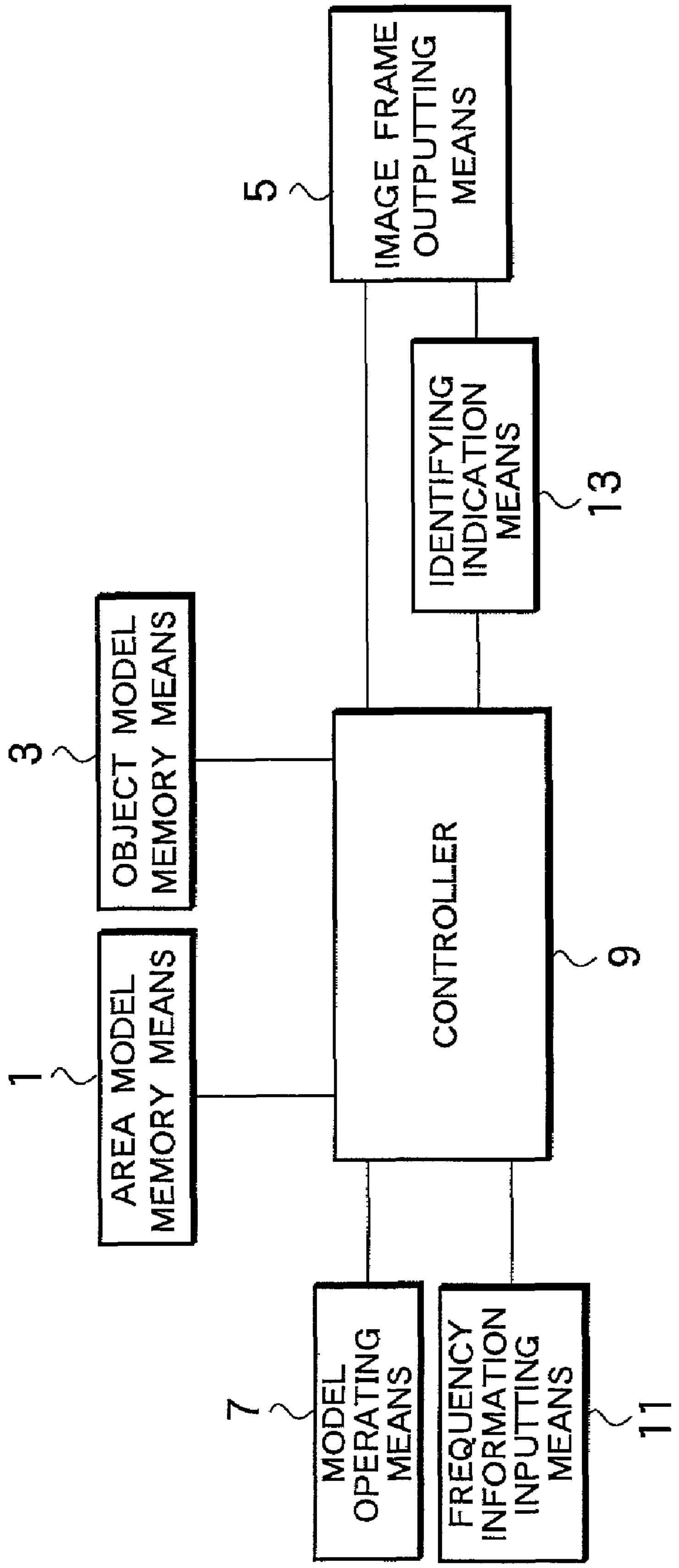
FIG. 1 is a block diagram of constitution according the present invention.

FIG. 1 shows a constitutional diagram of the present invention. As shown in FIG. 1, according to the invention, a method and an apparatus for optimum arrangement of selection objects has an area model memory means 1, an object model memory means 3, an image frame outputting means 5, a model operating means 7, a controller 9, a frequency information inputting means 11, and an identifying indication means 13.

The area model memory means 1 stores a configuration model of an area for a plurality of kinds of selection objects to be arbitrarily arranged therein. The object model memory means 3 stores configuration models of respective selection objects. The image frame outputting means 5 performs an image frame indication of the configuration models of the selection objects and the area. The model operating means 7 performs an arranging operation of the configuration models of the respective selection objects on the configuration model of the area in an image frame. The controller 9 arranges the configuration models of the respective selection objects on the configuration model of the area in accordance with the arranging operation. The frequency information inputting means 11 inputs to the controller 9 selection frequency information of the respective selection objects actually arranged in the area in accordance with an arrangement by the arranging operation. The identifying indication means 13 performs an identifying indication of the configuration models by the image frame indication in accordance with the input selection frequency information.

Further, the controller 9 rearranges the configuration models of the selection objects on the configuration model of the area by the arranging operation of the model operating means 7 in accordance with the identifying indication. Therefore, a result of the rearrangement is output to the image frame outputting means 5, allowing for the selection objects to be very easily rearranged in the area, while checking the image frame outputting means 5.

Figure 2:
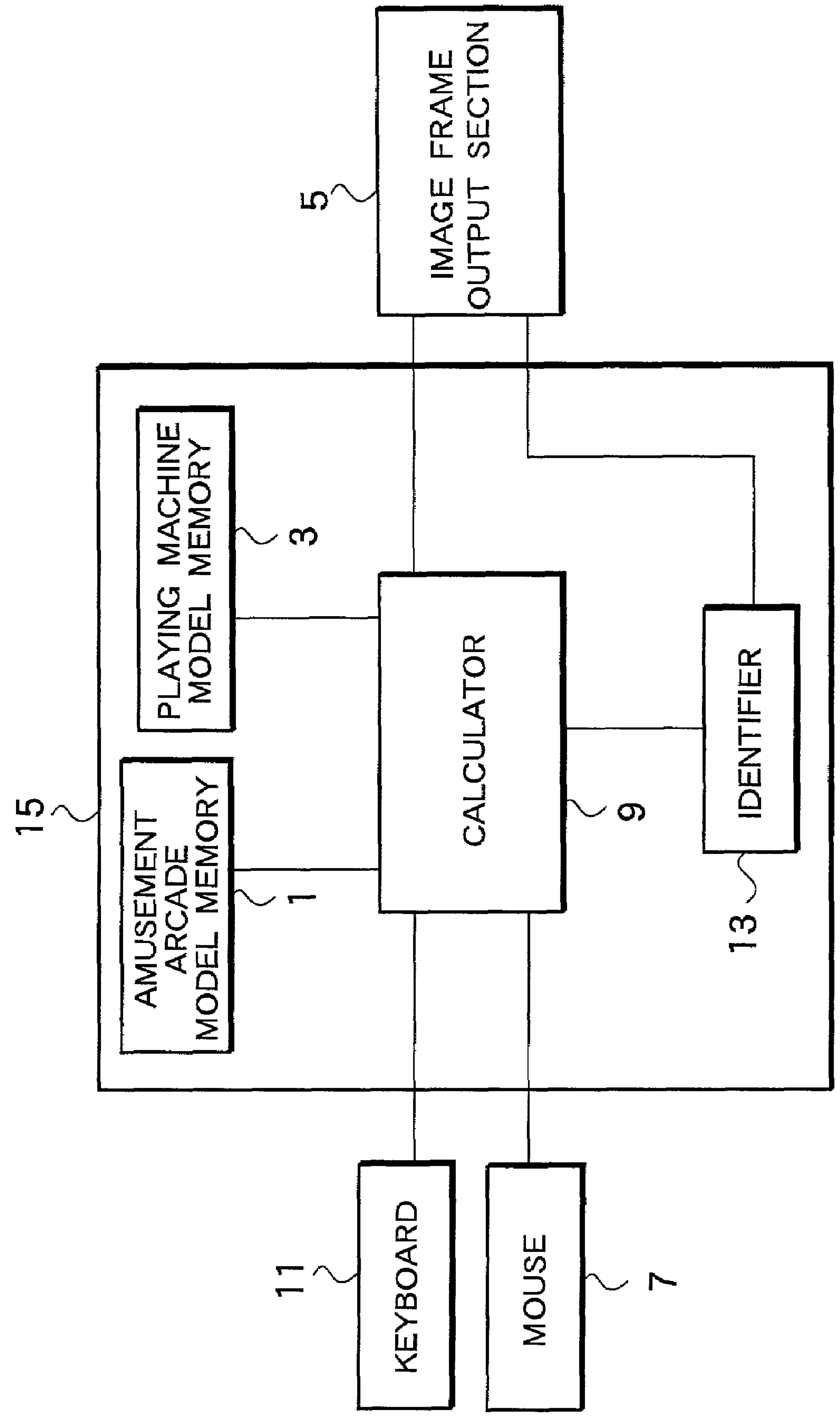
FIG. 2 is a block diagram according an embodiment of the present invention.

FIG. 2 shows in a block diagram an apparatus for optimum arrangement of selection objects according to an embodiment of the invention. This embodiment is for optimum arrangement of playing machines in an amusement arcade, and has an amusement arcade model memory 1 as the area model memory means, a playing machine model memory 3 as the object model memory means, a calculator 9 as the controller, and an identifier 13 as the identifying indication means. The amusement arcade model memory 1, playing machine model memory 3, calculator 9, and identifier 13 are formed by a microcomputer 15.

The amusement arcade model memory 1 has a model of the amusement arcade input to be stored therein in advance in the form of a plan view or bird's-eye view as a configuration model of the area. The playing machine model memory 3 has configuration models of a plurality of kinds of playing machines as a plurality of kinds of selection objects place input to be stored therein in advance in the form of plan views or bird's-eye views.

The microcomputer 15 is connected at the output side to an image frame output section 5 as the image frame outputting means. The image frame output section 5 is formed by a CRT, liquid crystal display, or the like, and adapted for image frame indication of the amusement arcade model and playing machine models on a screen.

The microcomputer 15 is connected at the input side to a mouse 7, and a keyboard 11. The mouse 7 constitute the model operating means, and is operative to perform an arrangement operation of playing machine models on the amusement arcade model displayed at the image frame output section 5. It however is noted that the keyboard 11 or a pen inputting measure is employable as the model operating means, so that it is possible, by a direct pen input or operation of the keyboard 11, to make operations such as of playing machine models on the display screen of the image frame output section 5.

The keyboard 11 constitutes the frequency information inputting means in this embodiment, and is adapted for inputting money collection information of a respective playing machine in the amusement arcade as a selection frequency of selection object.

It therefore is possible, by operation of the mouse 7, to arrange a playing machine model on the amusement arcade model, checking an image frame indication of the image frame output section 5, allowing for a respective playing machine to be arranged in the amusement arcade in accordance with that arrangement. Then, as money collection information associated with actual work of the respective playing machine is input from the keyboard 11, it is calculated in the calculator 9, with a result of calculation output to the identifier 13. At the identifier 13, a signal is output for an identification to be performed of the respective playing machine model arranged on the amusement arcade model on the image frame output section 5 in accordance with the frequency of use. By this output, an identifying indication of the respective playing machine model arranged on the amusement arcade model on the image frame output section 5 is performed in accordance with the selection frequency (the frequency of use) . This identifying indication may for example be performed by a color coding depending on the selection frequency. The color coding for the identifying indication may for example be a blue for high selection frequency, a yellow for medium, and a red for low selection frequency. It is noted that the identifying indication may be performed by else than the color coding, for example by a marking or legend.

Figure 3:
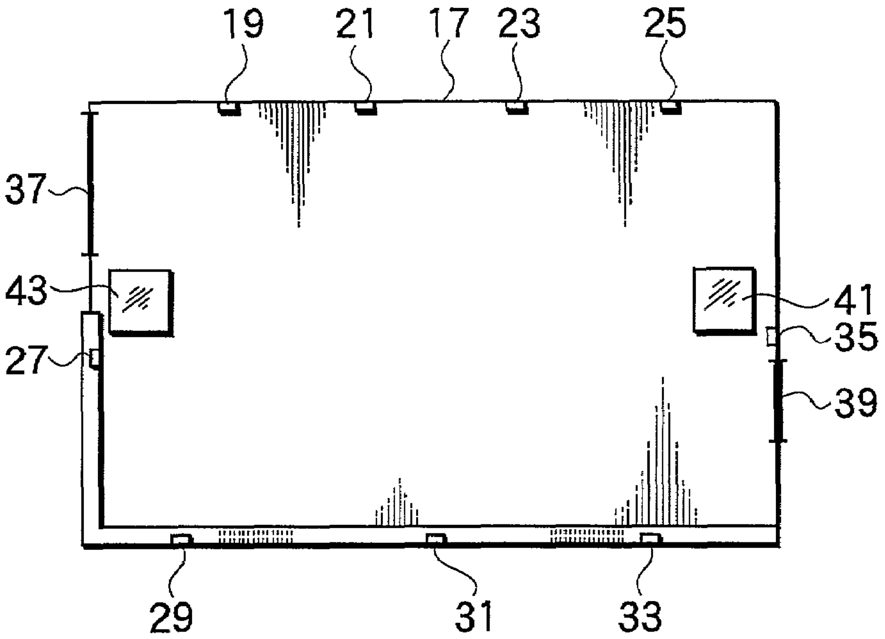
FIG. 3 is a plan view of an amusement arcade model according to the embodiment.

FIG. 3 shows an amusement arcade model 17 stored in the amusement arcade model memory 1, as a rectangular area in this embodiment. The amusement arcade model 17 has area environment information including for example location information 19, 21, 23, 25, 27, 29, 31, 33, and 35 of power supply outlets, location information 37 of an entrance and an exit, location information 39 of an emergency exit, and interior information 41 and 43. It is noted that the area environment information may have other information, and may include any of such area environment information or an arbitrary combination thereof to be selective.

Figure 4:
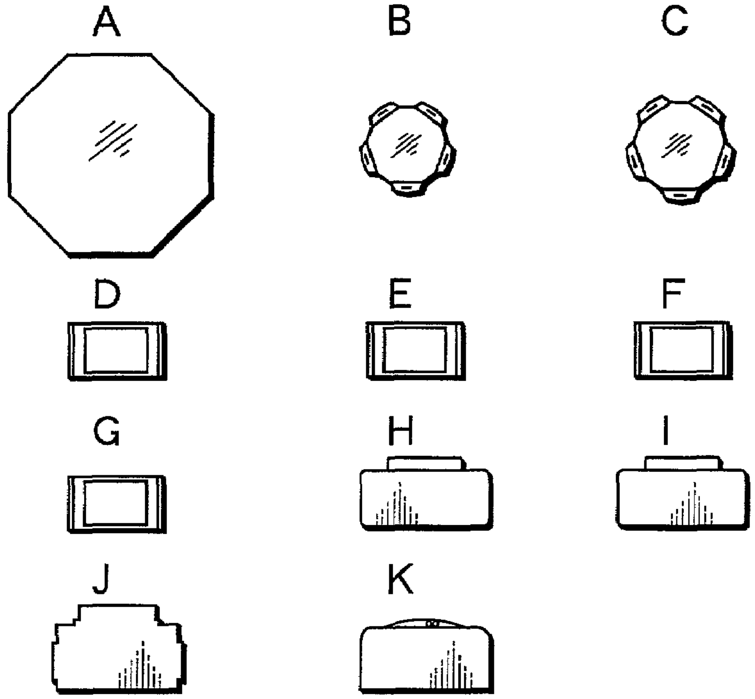
FIG. 4 is a plan view of playing machine models according to the embodiment.

FIG. 4 shows a plurality of kinds of playing machine models stored in the playing machine model memory 3. There are illustrated playing machine models A, B, C, D, E, F, G, H, I, J, and K by description of the machine kinds.

Figure 5:
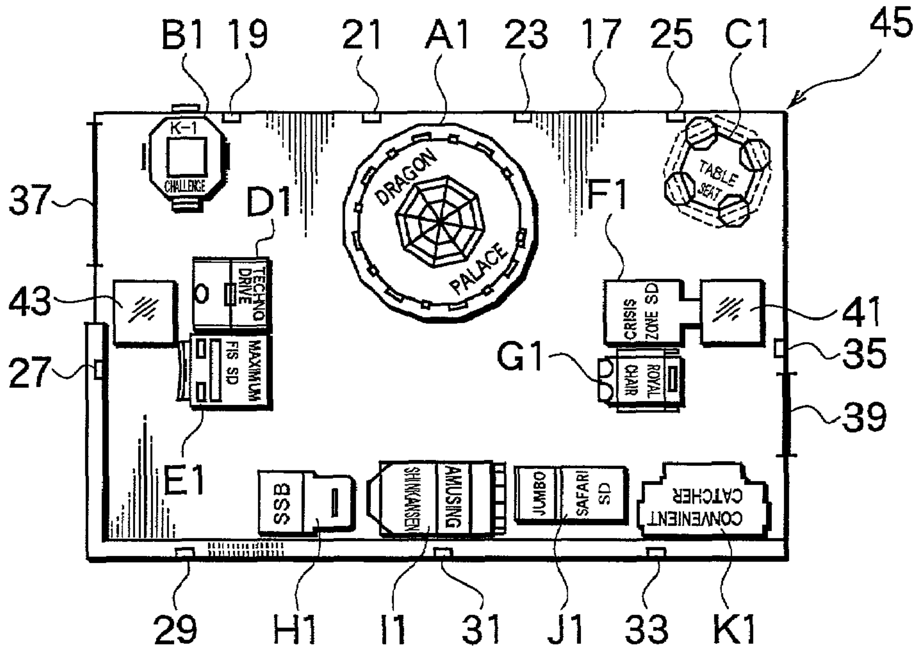
FIG. 5 is a plan view of a board of magnetic material and magnet members according to the embodiment.

FIG. 5 shows a board 45 of magnetic material indicating the amusement arcade model, and a plurality of magnet members A1, B1, C1, D1, E1, F1, G1, H1, I1, J1, and K1 respectively indicating the playing machine models, as the magnet members A1 to K1 are magnetically attracted to the board 45. The board 45 has the area environment information including for example location information 19, 21, 23, 25, 27, 29, 31, 33, and 35 of power supply outlets, location information 37 of an entrance and an exit, location information 39 of an emergency exit, and interior information 41 and 43.

First, in FIG. 5, on the board 45, there arranged the magnet members A1 to K1 indicating respective playing machine models, to be magnetically attracted thereto. In this arrangement, as area environment information on the board 45, there can be arranged the location information 19, 21, 23, 25, 27, 29, 31, 33, and 35 of power supply outlets, location information 37 of an entrance and an exit, location information 39 of an emergency exit, and interior information 41 and 43, while checking them, so that the arrangement can be accurate and easy to be optimum in positions relative to those area environmental information.

Next, by operation of the keyboard 11 or the like, the amusement arcade model 17 and playing machine models A to K shown in FIGS. 3 and 4 are read from the amusement arcade model memory 1 and playing machine model memory 3, respectively, to be indicated in a memory on the image frame output section 5. This image frame indication may for example be in a condition that such playing machine models A to K as shown in FIG. 4 are separately arrayed to be arranged about such an amusement arcade model 17 as shown in FIG. 3.

Checking the image frame indication of the image frame output section 5, the mouse 7 is employed to arrange the respective playing machine models A to K on the amusement arcade model 17, while confirming the arrangement of magnet members A1 to K1 on the board 45. In this arrangement, as area environment information provided for the amusement arcade model 17, there can be arranged the location information 19, 21, 23, 25, 27, 29, 31, 33, and 35 of power supply outlets, location information 37 of an entrance and an exit, location information 39 of an emergency exit, and interior information 41 and 43, while checking them. The area environment information on the amusement arcade model 17 has a corresponding relationship with that on the board 45, so that the arrangement on the board 45 can be accurately and easily reproduced on the image frame. The image frame after the arrangement is stored in a memory of the microcomputer 15.

Figure 6:
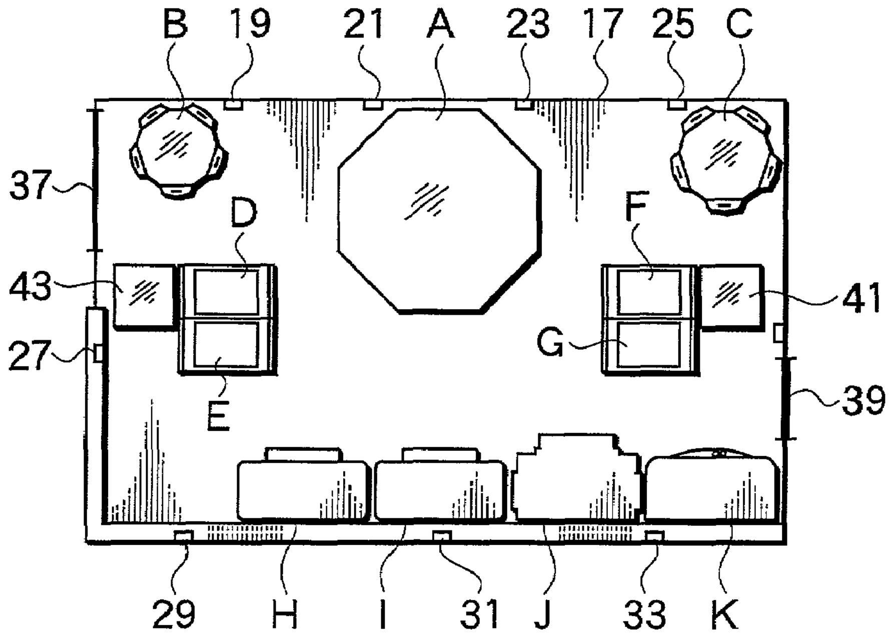
FIG. 6 is a plan view of an image frame indication after arrangement according to the embodiment.

Then, the image frame indication of the image frame output section 5 becomes as shown in FIG. 6, for example. FIG. 6 illustrates an arrangement of the amusement arcade model 17 and playing machine models A to K in a plan view, which can for example be changed by an input from the keyboard 11, to an indication by a bird's-eye view of FIG. 7, as well. Further, by an input operation from the keyboard 11, the plan view and bird's-eye view shown in FIGS. 6 and 7 can also be concurrently displayed on the image frame output section 5. Checking such an image frame indication, it is possible to grasp in advance a plan or stereoscopic arrangement of playing machines in an amusement arcade, allowing for an accurate and easy visible check.

In the amusement arcade, there can be achieved an actual arrangement of the playing machines, directly checking the board 45 after the above-noted arrangement, allowing for an accurate and easy arrangement. It also is possible to perform an actual arrangement of respective playing machines, checking the image frame indication.

Then, in the amusement arcade after the arrangement, the respective playing machines are let to work, collecting selection frequency information of the playing machines. In this embodiment, the selection frequency information is taken, for example, as such money collection information that is illustrated in FIG. 8. As the money collection information, there are collected description of machine kinds A to K, a total sale for each description ÓM1, ÓM1 . . . , number of work days, sale per day m1, m2, . . . , etc., to be input to the microcomputer 15 by the keyboard 11. This input of money collection information of respective playing machines A to K by the keyboard 11 may however be substituted by an automatic input through an on-line or wireless communication to the microcomputer 15.

Figure 9:
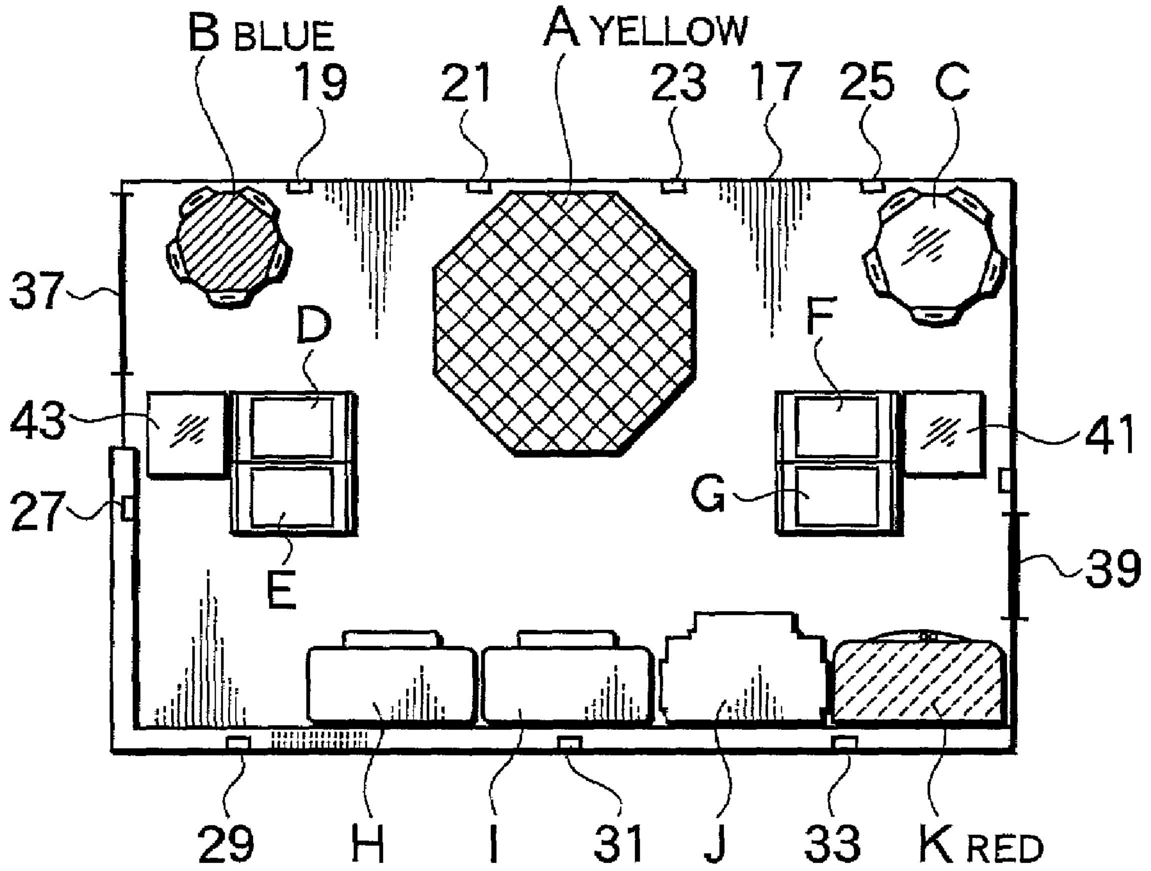
FIG. 9 is a plan view of an image frame indication showing an identifying indication according to the embodiment.

By such inputs, the calculator 9 is allowed to calculate a selection frequency of each playing machine A to K. This calculation of selection frequency may for example be such that a plurality of staged threshold values are provided for the sale per day, and the threshold values are separated depending if it exceeds the sale per day m1, m2, . . . , and, as shown in FIG. 9, the playing machine models A to K are color coded depending on the selection frequency. The color coding may for example be a blue for high frequency of use, a yellow for medium frequency of use, and a red for low frequency of use, as described. A visual check to the color coding allows for the frequency of use to be clearly and easily grasped at a glance. Although the color coding is expressed by words in FIG. 9, it is noted that actually respective corresponding playing machine models are colored.

Next, checking the color coding of image frame indication of the image frame output section 5, the magnet members A1 to K1 are first rearranged on the board 45 of FIG. 5, whereby anyone can easily perform a rearrangement. Because the rearrangement can be made checking such an identifying indication as shown in FIG. 9, it is possible to perform a very accurate and easy rearrangement while wholly grasping an amusement arcade and a plurality of playing machines.

When changing the arrangement, for example, in the case in FIG. 5 the magnet member K1 of a playing machine low of selection frequency is removed to a position of the magnet member B1 of a playing machine high of selection frequency, it is possible to make a decision in advance, such that, due to a relationship such as to a configuration of part of the amusement arcade as a destination of the removal or to a power supply outlet 19, the playing machine can not be directly placed on the part, or some playing machine can not be arranged there for a capacity of available power supply outlet, thus allowing for an accurate rearrangement.

Moreover, even when removing the magnet member K1 of a playing machine to a position of the magnet member B1, it is possible to make a prompt visual decision as to by which route in the amusement arcade 17 the removal should be performed in consideration of other playing machines to be possibly kept from displacement to achieve efficient work, allowing for the rearrangement to be easily and accurately performed from such a point of view, as well.

Figure 7:
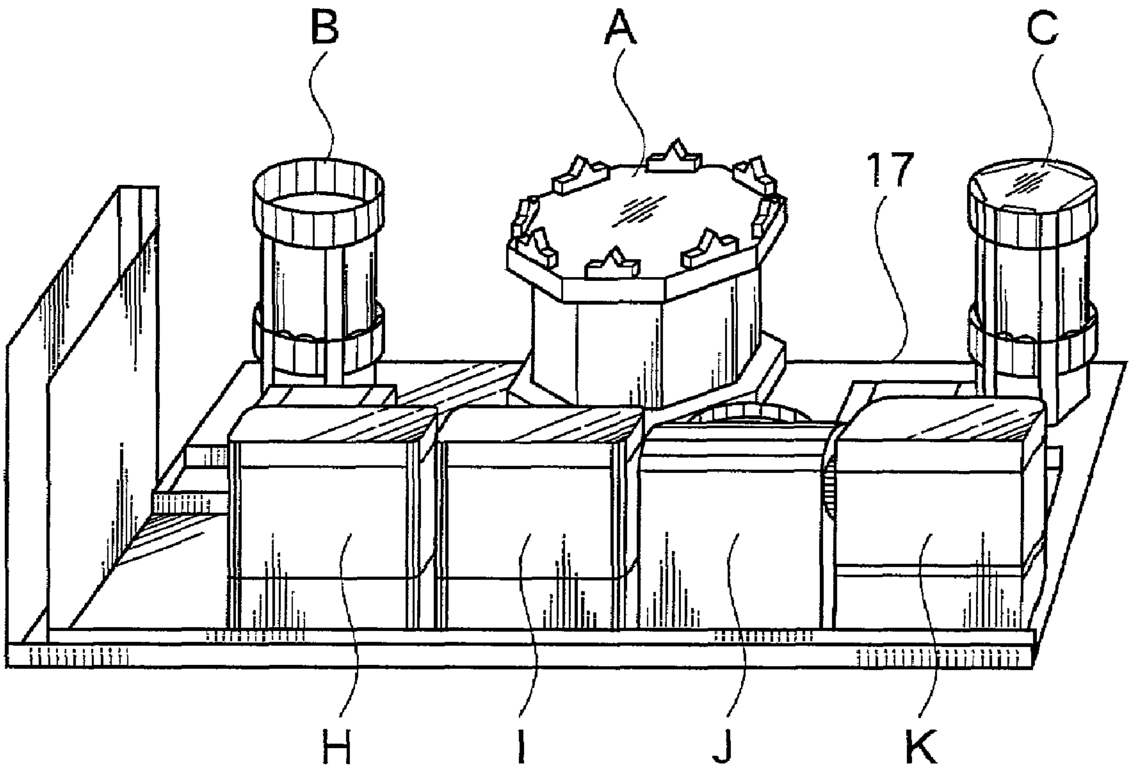
FIG. 7 is a bird's-eye view of the image frame indication after arrangement according to the embodiment.

Further, even in such a bird's-eye view as shown in FIG. 7, by an identifying indication such as by the above-noted color coding, it also is possible to make a rearrangement checking a condition in the height direction, allowing for the rearrangement to be more accurate.

After completion of a rearrangement on the board 45, the mouse 7 is used again, to have a rearrangement performed on an image frame of the image frame output section 5 in accordance with the rearrangement on the board 45. This rearrangement is additionally stored in the memory of the microcomputer 15. Then, there is performed a rearrangement of respective playing machines in the amusement arcade, depending on the above-noted condition of rearrangement.

Like this, by preliminary rearrangements on the amusement arcade model 17 and on the board 45, there is achieved actual rearrangement, allowing for the rearrangement to be accurate and easy.

Then, a playing machine high of selection frequency and a playing machine low of selection frequency are removed to change their places, allowing for a decision to be made, if resultant selection frequencies of the playing machines are left as they were, such that the playing machine low of selection frequency should be problematic in the machine itself, while the playing machine high of selection frequency should be good in the machine itself. In the case the playing machine low of selection frequency has an increased selection frequency by the removal for change of place, it is possible to decide such that the machine itself is non-problematic, but the place after removal should be good.

As a result, it is possible to exclude a playing machine from the amusement arcade if the machine itself is problematic, or to rearrange all the playing machines in consideration of locations in the amusement arcade to be good or bad. By repeating such rearrangement by inputting money collection information, it is possible to promote an optimization of arrangement of playing machines in the amusement arcade.

In the embodiment described, arrangement is once performed on the board 45 before arrangement on an image frame. The board 45 may however be omitted to perform both arrangement and rearrangement simply on an image frame. Further, the embodiment described performs an optimization of rearrangement of playing machines, respective characteristics of a playing machine high of selection frequency or a particular location high of selection frequency in the amusement arcade may be collected for analysis to provide resultant information for employment in construction of a new amusement arcade to be optimized in arrangement from an initial phase.

The plurality of kinds of selection objects and the area are not limited to playing machines and an amusement arcade. The plurality of kinds of selection objects may be a plurality of kinds of articles, and the area may be a shop for selling the articles, thereby allowing for the arrangement of articles to be optimized.

Further, it also is possible to employ a constitution in which the selection frequency information is input by a wireless communication using the Internet.

What is claimed is:

1. A method for arrangement of a plurality of different kinds of electrically powered selection objects, comprising the steps of:

providing a configuration model on a computer of an area for the plurality of different kinds of electrically powered selection objects to be arbitrarily arranged therein, and providing configuration models in said computer of respective electrically powered selection objects;

performing art arrangement of the configuration models of the respective electrically powered selection objects on the configuration model of the area;

collecting frequency of utilization information for each electrically powered selection object;

said plurality of selection objects including a first object disposed in a first location and having a low frequency of utilization and a second object disposed in a second location and having a high frequency of utilization, said method further comprising the steps of:

visually identifying and categorizing each selection object based on said frequency of utilization for each object;

repositioning said first object in said second location and said second object in said first location and determining whether there is an increase in frequency of utilization for said first object and a decrease in frequency of utilization for said second object;

collecting respective characteristics of an electrically powered selection object having a high frequency of utilization or a location having a high frequency of utilization for analysis to provide resultant information;

further rearranging the configuration models of the electrically powered selection objects on die configuration model of the area through a relation to an area environment information, including information relating to power supply outlets for the plurality of different kinds of electrically powered selection objects; a relation to a configuration of a location of the configuration model of the area and a relation to configuration models of other electrically powered selection objects in accordance with the identifying indication and the resultant information, to simulate rearranging the electrically powered selection objects to decide routes for a rearrangement of the electrically powered selection objects and a state after the rearrangement; and rearranging the electrically powered selection objects in the area in correspondence to the rearrangement.

2. An apparatus for arrangement of a plurality of different kinds of electrically powered selection objects, comprising:

area model memory means for storing a configuration model of an area for the plurality of kinds of selection objects to be arbitrarily arranged therein;

object model memory means for storing configuration models of respect electrically powered selection objects;

image frame outputting means for performing an image frame indication of the configuration models of the electrically powered selection objects and the area;

model operating means for performing an arranging operation of the configuration models of the respective electrically powered selection objects on the configuration model of the area in an image frame;

a controller for arranging the configuration models of the respective electrically powered selection objects on the configuration model of the area in accordance with the arranging operation;

frequency utilization information inputting means for inputting to the controller frequency utilization for each selection object; and identifying indication means for performing a visual categorization and an identifying indication of the configuration models by the image frame indication in accordance with each input utilization frequency information in order to classify each configuration model of the electrically powered selection objects, wherein said plurality of selection objects includes a first object disposed in a first location and having a low frequency of utilization adjacent and a second object disposed in a second location and having a high frequency of utilization, and the controller rearranges the configuration models of the electrically powered selection objects on the configuration model of the area by the arranging operation of the model operating means through;

repositioning said first object in said second location and said second object in said first location and determining whether there is an increase in frequency of utilization for said first object and a decrease in frequency of utilization for said second object;

collecting respective characteristics of and electrically powered selection object having a high frequency of utilization or a location having a high frequency of utilization for analysis to provide resultant information;

relating to an area environment information, including information relating to power supply outlets for the plurality of different kinds of electrically powered selection objects, a configuration of a location of the configuration model of the area and configuration models of other electrically powered selection objects in accordance with the identifying indication and the resultant information, in order to simulate rearranging the electrically powered selection objects in the area to decide routes for a rearrangement of the electrically powered selection objects and a state after the rearrangement, in correspondence to the arrangement of the simulated result.

3. The apparatus of claim 2, wherein the image frame outputting means performs the image frame indication of the configuration models of the electrically powered selection objects and the area by at least one of a plan view and a bird's eye view.

4. The apparatus of claim 2, further comprising:

a board of magnetic material indicating the configuration model of the area; and a plurality of magnet members, respectively indicating the configuration models of the plurality of different kinds of electrically powered selection objects.

5. Presented) The apparatus of claim 3, further comprising:

a board of magnetic material indicating the configuration model of the area; and a plurality of magnet members respectively indicating the configuration models of the plurality of different kinds of electrically powered selection objects.

6. The apparatus of claim 2, wherein the area comprises an amusement arcade for game playing machines to be arranged therein;

the plurality of different kinds of electrically powered selection objects comprise a plurality of different kinds of game playing machines; and the selection frequency information comprises money collection information from respective game playing machines.

7. The apparatus of claim 3, wherein the area comprises an amusement arcade for game playing machines to be arranged therein;

the plurality of different kinds of electrically powered selection objects comprise a plurality of different kinds of game playing machines; and the selection frequency information comprises money collection information from respective game playing machines.

8. The apparatus of claim 4, wherein the area comprises an amusement arcade for game playing machines to be arranged therein;

the plurality of different kinds of electrically powered selection objects comprise a plurality of different kinds of game playing machines; and the selection frequency information comprises money collection information from respective game playing machines.

9. The apparatus of claim 5, wherein the area comprises an amusement arcade for game playing machines to be arranged therein;

the plurality of different kinds of electrically powered selection objects comprise a plurality of different kinds of game playing machines; and the selection frequency information comprises money collection information from respective playing machines.

10. The apparatus of claim 6, wherein the configuration model or the area has area environment information.

11. The apparatus of claim 7, wherein the configuration model of the area has area environment information.

12. The apparatus of claim 8, wherein the configuration model of the area has area environment information.

13. The apparatus of claim 9, wherein the configuration model of the area has area environment information.

14. The apparatus of claim 10, wherein the area environment information comprises at least one of location information of at least one power service outlet, location information of at least one entrance and at least one exit, location information of at least one emergency exit, and interior information.

15. The apparatus of claim 11, wherein the area environment information comprises at least one of location information of at least one power service outlet, location information of at least one entrance and at least one exit, location information of at least one emergency exit, and interior information.

16. The apparatus of claim 12, wherein the area environment information comprises at least one of location information of at least one power service outlet, location information of at least one entrance and at least one exit, location information of at least one emergency exit, and interior information.

17. The apparatus of claim 13, wherein the area environment information comprises at least one of location information of at least one power service outlet, location information of at least one entrance and at least one exit, location information of at least one emergency exit, and interior information.

18. A method for arrangement of a plurality of different kinds of electrically powered selection objects, comprising the steps of:

providing a configuration model on a computer of an area for the plurality of kinds of electrically powered selection objects to be arbitrarily arranged therein by and providing configuration models in, said computer of respective electrically powered selection objects;

performing an arrangement of the configuration models of the respective electrically powered selection objects on the configuration model of the area; collecting frequency of utilization information for each electrically powered selection object;

said plurality of selection objects including a first object disposed in a first location and having a low frequency of utilization and a second object disposed in a second location and having a high frequency of utilization, said method further comprising the steps of;

visually identifying and categorizing each selection object based on said frequency of utilization for each object;

repositioning said first object in said second location and said second object in said first location and determining whether there is an increase in frequency of utilization for said first object and a decrease in frequency of utilization for said second object;

collecting respective characteristics of an electrically powered selection object having a high frequency of utilization or a location having a high frequency of utilization, for analysis to provide resultant information;

further rearranging the configuration models of the electrically powered selection objects on the configuration model of the area through a relation to an area environment information, including information relating to power supply outlets for the plurality of different kinds of electrically powered selection objects, in accordance with the identifying indication and the resultant information, to simulate rearranging the electrically powered selection objects; and rearranging the electrically powered selection objects in the area in correspondence to the rearrangement.

19. A method for arrangement of a plurality of different kinds of electrically powered selection objects comprising the steps of:

providing a configuration model on a computer of an area for the plurality of kinds of electrically powered selection objects to be arbitrarily arranged therein, and providing configuration models in said computer of respective electrically powered selection objects;

performing an arrangement of the configuration models of the respective electrically powered selection objects on the configuration model of the area;

collecting frequency of utilization information for each electrically powered selection object;

said plurality of selection objects including a first object disposed in a first location and having a low frequency of utilization and a second object disposed in a second location and having a high frequency of utilization, said method further comprising the steps of;

visually identifying and categorizing each selection object based on said frequency of utilization for each object;

repositioning said first object in said second location and said second object in said first location and determining whether there is an increase in frequency of utilization for said first object and a decrease in frequency of utilization for said second object;

further rearranging the configuration models of the electrically powered selection objects on the configuration model of the area through a relation to an area environment information, including information relating to power supply outlets for the plurality of different kind of electrically powered selection objects, a relation to a configuration of a location of the configuration model of the area and a relation to configuration models of other electrically powered selection objects in accordance with the identifying indication and the determination, to simulate rearranging the electrically powered selection objects to decide routes for a rearrangement of the electrically powered selection objects and a state alter the rearrangement; and rearranging the electrically powered selection objects in the area in correspondence to the rearrangement.

20. An apparatus for arrangement of a plurality of different kinds of electrically powered objects, comprising:

area model memory means for storing a configuration model of an area for the plurality of kinds of selection objects to be arbitrarily arranged therein;

object model memory means for storing configuration models of respective electrically powered selection objects;

image frame outputting means for performing an image frame indication of the configuration models of the electrically powered selection objects and the area;

model operating means for performing an arranging operation of the configuration models of the respective selection, electric objects on the configuration model of the area in an image frame;

a controller for arranging the configuration models of the respective electrically powered selection objects on the configuration model of the area in accordance with the arranging operation;

frequency utilization information inputting means for inputting to the controller frequency utilization for each selection object; and identifying indication means for performing a visual categorization and an identifying indication of the configuration models by the image frame indication in accordance with each input utilization frequency information in order to classify each configuration model of the selection electric objects; wherein said plurality of selection objects includes a first object disposed in a first location and having a low frequency of utilization and a second object disposed in a second location and having a high frequency of utilization, and the controller rearranges the configuration models of the electrically powered selection objects on the configuration model of the area by the arranging operation of the model operating means through;

repositioning said first object in said second location and said second object in said first location and determining whether there is an increase in frequency of utilization for said first object and a decrease in frequency of utilization for said second object;

collecting respective characteristics of an electrically powered selection object having a high frequency of utilization or a location, having a high frequency of utilization for analysis to provide resultant information;

relating to an area environment information, including information relating to power supply outlets for the plurality of different kinds of electrically powered selection objects, in accordance with the identifying indication and the resultant information, in order to simulate rearranging the electrically powered selection objects in the area, in correspondence to the arrangement of the simulated result.

21. An apparatus for arrangement of a plurality of different kinds of electrically powered objects, comprising:

area model memory means for storing a configuration model of an area for the plurality of kinds of selection objects to be arbitrarily arranged therein;

object model memory means for storing configuration models of respective electrically powered selection objects;

image frame outputting means for performing an image frame indication of the configuration models of the electrically powered selection objects and the area;

model operating means for performing an arranging operation of the configuration models of the respective selection electric objects on the configuration model of the area in an image frame;

a controller for arranging the configuration models of the respective electrically powered selection objects on the configuration model of the area in accordance with the arranging operation;

frequency utilization information inputting means for inputting to the controller frequency utilization for each selection object; and identifying indication means for performing a visual categorization and an identifying indication of the configuration models by the image frame indication in accordance with each input utilization frequency information in order to classify each configuration model of the selection electric objects; wherein said plurality of selection objects includes a first object disposed in a first location and having a low frequency of utilization and a second object disposed in a second location and having a high frequency of utilization; and the controller rearranges the configuration models of the electrically powered selection objects on the configuration model of the area by the arranging operation of the model operating means through;

repositioning said first object in said second location and said second object in said first location and determining whether there is an increase in frequency of utilization for said first object and a decrease in frequency of utilization for said second object;

relating to an area environment information, including information relating to power supply outlets for the plurality of different kinds of electrically powered selection objects, the configuration of a location of the configuration model of the area and configuration models of other electrically powered selection objects in accordance with the identifying indication and the determination, in order to simulate rearranging the electrically powered selection objects in the area to decide routes for a rearrangement of the electrically powered selection objects and a state after the rearrangement, in correspondence to the arrangement of the simulated result.

* * * * *